United States Patent
Müller et al.

(10) Patent No.: US 8,581,718 B2
(45) Date of Patent: Nov. 12, 2013

(54) MOTOR VEHICLE

(75) Inventors: Ulrich Müller, Ingolstadt (DE); Aaron Rudolph, San Francisco, CA (US); Marcus Kühne, Ingolstadt (DE)

(73) Assignees: Volkswagen AG, Wolfsburg (DE); Audi AG, Ingolstadt (DE)

( * ) Notice: Subject to any disclaimer, the term of this patent is extended or adjusted under 35 U.S.C. 154(b) by 279 days.

(21) Appl. No.: 13/182,733

(22) Filed: Jul. 14, 2011

(65) Prior Publication Data

US 2013/0015964 A1 Jan. 17, 2013

(51) Int. Cl.
B60Q 1/00 (2006.01)

(52) U.S. Cl.
USPC .... 340/459; 340/3.71; 340/6.14; 340/815.86; 345/184; 74/473.3

(58) Field of Classification Search
USPC ............. 340/459, 425.5, 691.1, 691.6, 691.7, 340/2.2, 3.7, 3.71, 6.11, 6.14, 815.86; 715/786, 781; 345/145, 157, 184; 74/473.3
See application file for complete search history.

(56) References Cited

U.S. PATENT DOCUMENTS

| | | | |
|---|---|---|---|
| 5,270,689 A * | 12/1993 | Hermann | 345/157 |
| 6,636,197 B1 * | 10/2003 | Goldenberg et al. | 345/156 |
| 7,623,116 B1 | 11/2009 | Bidiville | |
| 7,643,017 B2 * | 1/2010 | Lai et al. | 345/184 |
| 7,978,186 B2 * | 7/2011 | Vassallo et al. | 345/184 |
| 8,264,338 B2 * | 9/2012 | Leon | 340/456 |
| 8,413,536 B2 * | 4/2013 | Giefer et al. | 74/473.3 |
| 2005/0259077 A1 | 11/2005 | Adams et al. | |
| 2010/0315349 A1 * | 12/2010 | Choi | 345/173 |
| 2011/0043468 A1 | 2/2011 | Lathrop et al. | |
| 2011/0138322 A1 * | 6/2011 | Aoki | 715/786 |

FOREIGN PATENT DOCUMENTS

| | | |
|---|---|---|
| DE | 10139693 A1 | 5/2002 |
| EP | 0366132 A2 | 5/1990 |

OTHER PUBLICATIONS

Search Report for International Patent Application No. PCT/EP2012/001082; Aug. 24, 2012.

* cited by examiner

*Primary Examiner* — Toan N Pham
(74) *Attorney, Agent, or Firm* — Barnes & Thornburg LLP

(57) ABSTRACT

The invention relates to a motor vehicle which includes a display for presenting a list of entries, wherein an entry has an associated function of the motor vehicle, and wherein the motor vehicle comprises a rotary knob which is associated with the display, which can be rotated about an axis of rotation and which can be rotated through a prescribed angle of rotation in order to move a marker from one entry to an entry which is adjacent thereto.

29 Claims, 5 Drawing Sheets

MOTOR VEHICLE

BACKGROUND TO THE INVENTION

The invention relates to a motor vehicle which comprises a display for presenting a list of entries, wherein an entry has an associated function of the motor vehicle, and wherein the motor vehicle comprises a rotary knob which is associated with the display, which can be rotated about its/an axis of rotation and which can be rotated through a prescribed angle of rotation in order to move a marker from one entry to an entry which is adjacent thereto.

According to DE 101 39 693 A1, modern electronic devices in the vehicle, which are continually providing additional functions having evermore options, have had multifunctional operator control elements provided for the associated operator control elements on account of the limited installation space, said multifunctional operator control elements being able to be used to control various functions of the connected devices. By way of example, EP 0 366 132 B1 discloses a multifunctional operator control device for motor vehicles in which function groups and individual functions are selected by means of a rotary switch and in which an ENTER-function can be initiated, wherein one and the same bi-directional rotary switch is used for the menu selection and the individual function selection. This rotary switch has latch positions which have associated menus or individual functions, wherein the ENTER-function can be initiated by axial movement of the rotary switch. Such a multifunctional operator control device is used for inputting destinations into a navigation system, for example. To this end, a display unit is used to depict an alphanumeric keypad in which the user can move forwards and backwards using the bi-directional movement of the rotary switch. When the cursor is then on the desired alphanumeric character, the latter can be selected and transferred to the navigation system using an axial movement of the rotary switch.

To speed up operator control, U.S. patent application Ser. No. 12/848,657 proposes that a motor vehicle comprises a first touch pad, integrated into the steering wheel of said motor vehicle, for inputting commands, a second touch pad, integrated into the steering wheel physically separately from the first touch pad, for inputting commands, and an evaluation module for producing a command (which is different from one produced by touching or touch movement of just a touch pad) for the operator control of a function of the motor vehicle on the basis of a touch movement (or a direction of the touch movement) using the first touch pad and a simultaneous touch movement (or a direction of the touch movement) using the second touch pad. Furthermore, the use of touch screens arranged above displays is known in motor vehicles.

It is an object of the invention to improve or simplify the operator control of a motor vehicle. In this case, it is particularly desirable for the driver to be distracted as little as possible from what is happening in the traffic even when controlling complex devices. Operator control of a motor vehicle should (in an alternative refinement) be able to be effected very quickly, in particular.

SUMMARY OF THE INVENTION

The aforementioned object is achieved by a motor vehicle which comprises a display for presenting a list of entries, wherein an entry has an associated function of the motor vehicle, and wherein the motor vehicle comprises a rotary knob which is associated with the display, which can be rotated about an axis of rotation and which can be rotated through a prescribed angle of rotation (in each case) in a first operator control mode in order to move a marker from one entry to an entry which is adjacent thereto, wherein the rotary knob can be moved in a first direction in an orientation of the axis of rotation in order to transfer it to a second operator control mode, in which the marker can be moved (through the list) at a prescribed speed or at a speed which is dependent on a rotation (or the angle of rotation) of the rotary knob.

Within the context of the invention, a function of a motor vehicle is, in particular, the reception frequency of a radio, the volume of an audible output in the motor vehicle, a sound setting (nature and balance), a track selection, a selection for a destination, the dialing of a telephone number or of a name and/or a temperature setting. A function of a motor vehicle within the context of the invention is particularly a function for which a setpoint value needs to be found from a selection of values.

A display within the context of the invention is particularly a matrix display. By way of example, a display within the context of the invention may be a TFT or an equivalent display apparatus. By way of example, a display within the context of the invention is a display integrated in a combined instrument and/or a display integrated in a central console or a dashboard next to a steering wheel, or may comprise such a display or displays.

An axis of rotation within the context of the invention is particularly a virtual axis running through the centerpoint or the center of a rotary movement of the rotary knob. An axis of rotation within the context of the invention is, in particular, at right angles to the rotary movement of the rotary knob.

A marker within the context of the invention may be or comprise an icon, a frame or another geometric figure. However, a marker within the context of the invention may also comprise any visual form of presentation which is suitable for highlighting. By way of example, a marker within the context of the invention may be or comprise highlighting of an entry by means of brightness, color or enlarged presentation. By way of example, a marker within the context of the invention may also comprise highlighting of an entry by means of other entries not being presented.

A movement in the first direction is, in particular, the rotary knob being pushed in. In this case, a movement in the second direction is the rotary knob being pulled out and/or released. However, provision may also be made for a movement in the first direction to be the rotary knob being pulled out. In this case, a movement in the second direction is the rotary knob being pushed in.

In particular, provision may be made for the rotary knob to be rotated anticlockwise and clockwise—particularly both in the first and in the second operator control mode. In this way, the direction of scrolling or the direction of movement of the marker is determined.

In one refinement of the invention, an entry marked by means of the marker can be selected by moving the rotary knob in a second direction (in an orientation of the axis of rotation), which is opposite to the first direction. In a further refinement of the invention, an entry marked by means of the marker can be selected by moving the rotary knob in the first direction and subsequently moving the rotary knob in a second direction (in an orientation of the axis of rotation) which is opposite to the first direction. In a further refinement of the invention, an entry marked by means of the marker can be selected by moving the rotary knob in the first direction and immediately subsequently moving the rotary knob in a second direction (in an orientation of the axis of rotation), which is opposite to the first direction. In a further refinement of the invention, an entry marked by means of the marker can be selected by moving the rotary knob in the first direction and subsequently moving the rotary knob in a second direction (in an orientation of the axis of rotation), which is opposite to the first direction, provided that the rotary knob is not rotated between the movement in the first direction and the movement in the second direction.

In a further refinement of the invention, the motor vehicle (also) comprises a mechanism for producing haptic feedback in the rotary knob when the marker is moved from one entry to the adjacent entry. A mechanism within the context of the invention may be a passive or active mechanism. In particular, a mechanism within the context of the invention may also be an actuator for producing haptic feedback. By way of example, such an actuator can, in particular, be actuated by means of a controller for actuating the display and for evaluating operator control actions using the rotary knob. In a further refinement of the invention, the motor vehicle (also) comprises a mechanism for producing haptic feedback in the rotary knob when the marker is moved from one entry to the adjacent entry in the first operator control mode and not in the second operator control mode. Haptic feedback, particularly haptic feedback in the first operator control mode, is, in particular, a click or a latching feeling when the marker skips one entry forward.

In a further refinement of the invention, the mechanism is used to produce a restoring force in the rotary knob and/or a vibration symbolizing the speed of movement of the marker when said rotary knob is rotated in the second operator control mode and not in the first operator control mode. In a further refinement of the invention, the motor vehicle (also) comprises a mechanism for producing a restoring force in the rotary knob when said rotary knob is rotated in the second operator control mode and not in the first operator control mode.

In a further refinement of the invention, the motor vehicle comprises a controller which is associated with the display. Said controller is used particularly for the operator control of a selected function of the motor vehicle and/or for presenting the list on the display.

The aforementioned object is also achieved by a motor vehicle which comprises a display and a controller, associated with the display, for the operator control of a function of the motor vehicle and for presenting a list of entries on the display, wherein an entry has an associated function of the motor vehicle, and wherein the motor vehicle comprises a rotary knob which can be rotated about an axis of rotation in a first operator control mode, wherein the rotary knob can be moved in a first direction in an orientation of the (or its) axis of rotation in order to transfer it to (at least) a second operator control mode, in which the rotary knob can be used to scroll through the list at a prescribed speed or at a speed which is dependent on a rotation (or the angle of rotation) of the rotary knob.

In one refinement of the invention, an entry can be selected by moving the rotary knob in a second direction (in an orientation of the axis of rotation), which is opposite to the first direction. In a further refinement of the invention, an entry can be selected by moving the rotary knob in the first direction and subsequently moving the rotary knob in a second direction (in an orientation of the axis of rotation), which is opposite to the first direction. In a further refinement of the invention, an entry can be selected by moving the rotary knob in the first direction and immediately subsequently moving the rotary knob in a second direction (in an orientation of the axis of rotation), which is opposite to the first direction. In a further refinement of the invention, an entry can be selected by moving the rotary knob in the first direction and subsequently moving the rotary knob in a second direction (in an orientation of the axis of rotation), which is opposite to the first direction, provided that the rotary knob is not rotated between the movement in the first direction and the movement in the second direction.

In a further refinement of the invention, the motor vehicle (also) comprises a mechanism for producing haptic feedback in the rotary knob when scrolling through the list. In a further refinement of the invention, the motor vehicle (also) comprises a mechanism for producing haptic feedback in the rotary knob when scrolling through the list in the first operator control mode but not in the second operator control mode. In a further refinement of the invention, the mechanism can be used to produce a restoring force in the rotary knob when said rotary knob is rotated in the second operator control mode and not in the first operator control mode. In a further refinement of the invention, the motor vehicle (also) comprises a mechanism for producing a restoring force in the rotary knob when said rotary knob is rotated in the second operator control mode and not in the first operator control mode.

The aforementioned object is also achieved by a method for the operator control of a function of a motor vehicle (by selecting one entry from a list of entries), wherein the method comprises the following steps:

presentation of a list of entries on a display in the motor vehicle;

(subsequent) movement of a rotary knob in the motor vehicle in a first direction in an orientation of an axis of rotation of the rotary knob;

(subsequent) rotation of the rotary knob, wherein a marker is moved through the list at a prescribed speed or at a speed which is dependent on the rotation (or the angle of rotation) of the rotary knob;

(subsequent) movement of the rotary knob in a second direction (in an orientation of the axis of rotation), which is opposite to the first direction;

(subsequent) movement of the rotary knob in the first direction; and (subsequent) selection of an entry marked by means of the marker from the list by moving the rotary knob in the second direction.

In one refinement of the invention, the function of the motor vehicle which is associated with the selected entry is executed.

The aforementioned object is also achieved by a method for the operator control of a function of a motor vehicle (by selecting one entry from a list of entries), wherein the method comprises the following steps:

presentation of a list of entries on a display in the motor vehicle;

(subsequent) movement of a rotary knob in the motor vehicle in a first direction in an orientation of an axis of rotation of the rotary knob;

(subsequent) rotation of the rotary knob, wherein a marker is moved through the list at a prescribed speed or at a speed which is dependent on the rotation (or the angle of rotation) of the rotary knob; and (subsequent) movement of the rotary knob in a second direction (in an orientation of the axis of rotation), which is opposite to the first direction.

In one refinement of the invention, the method (also) comprises:

(subsequent) rotation of the rotary knob, wherein the marker is moved from one entry to an entry which is adjacent thereto by rotating the rotary knob through a prescribed angle of rotation, or (subsequent) rotation of the rotary knob, wherein the marker is moved from one entry to an entry which is adjacent thereto by rotating the rotary knob through a prescribed angle of rotation, wherein the rotary knob is rotated until a desired entry is marked by means of the marker.

In a further refinement of the invention, the method (also) comprises:
(subsequent) movement of the rotary knob in the first direction.

In a further refinement of the invention, the method (also) comprises:
(subsequent) selection of an entry marked by means of the marker from the list by moving the rotary knob in the second direction.

In one refinement of the invention, the function of the motor vehicle which is associated with the selected entry is executed.

A motor vehicle within the context of the invention is, in particular, a land vehicle which can be used individually in road traffic. In particular, motor vehicles within the context of the invention are not limited to land vehicles with an internal combustion engine.

Further advantages and details can be found in the description of exemplary embodiments below.

DETAILED DESCRIPTION OF PREFERRED EXEMPLARY EMBODIMENTS

Figure 1:
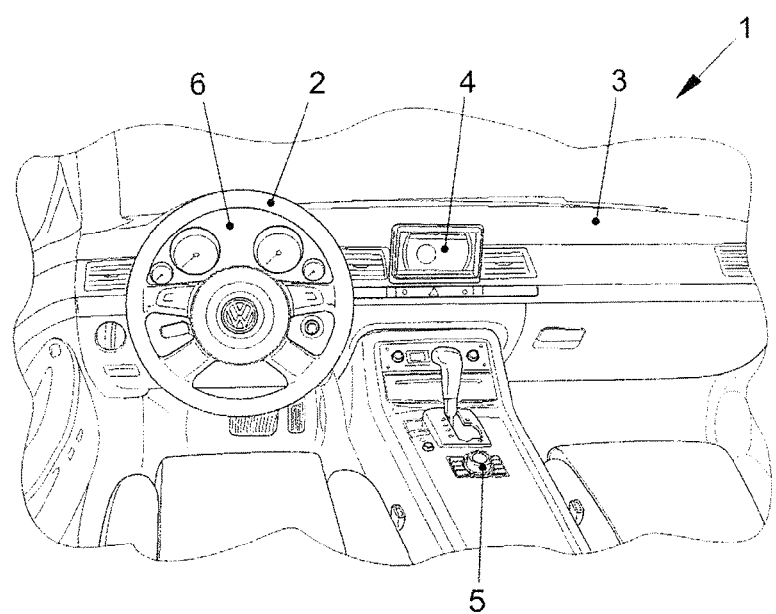
FIG. 1 shows details from an interior view of an exemplary embodiment of a motor vehicle.
Figure 2:
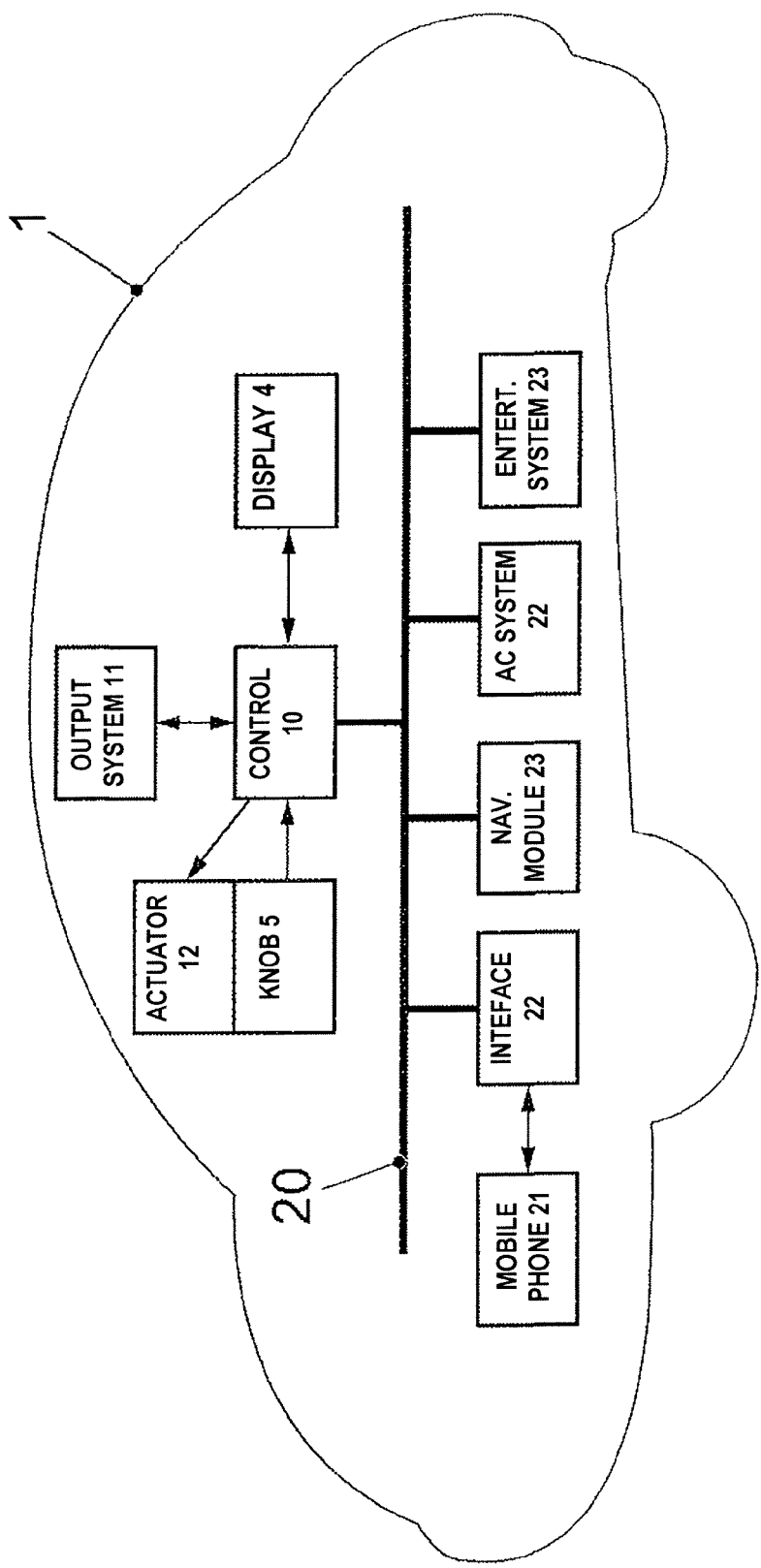
FIG. 2 shows a schematic diagram of the motor vehicle shown in FIG. 1.

FIG. 1 shows details from an interior view of an exemplary embodiment of a motor vehicle 1, a functional schematic diagram of which is shown in FIG. 2. The motor vehicle 1 comprises a display 4, arranged in the area of the dashboard 3 in the motor vehicle 1, for the operator control of the motor vehicle 1. To this end, provision may be made for the display 4 to have a touch screen arranged above it. The motor vehicle 1 can be controlled (in particular additionally) by means of a rotary knob, denoted by reference symbol 5, in interaction with the display 4. Furthermore, the motor vehicle 1 comprises a combined instrument 6 which is arranged in front of the steering wheel 2. The comments below in relation to the display 4 may also alternatively or additionally apply to a display integrated in the combined instrument 6.

For the purpose of operator control of the motor vehicle 1 or of individual functions of the motor vehicle 1 using the display 4 or a touch screen arranged above the latter or the rotary knob 5, a display and operator control 10 is provided which can also be used to actuate and read a voice input and output system 11. The display and operator control 10 is connected via a bus system 20 to a telephone interface 22 for the operator control of a mobile telephone 21, to a navigation module 23, to an automatic air conditioning system 24 and to an entertainment system 25, which are able to be operator controlled by means of the display and operator control 10 or the voice input and output system 11, the rotary knob 5 and the display 4.

Figure 3:
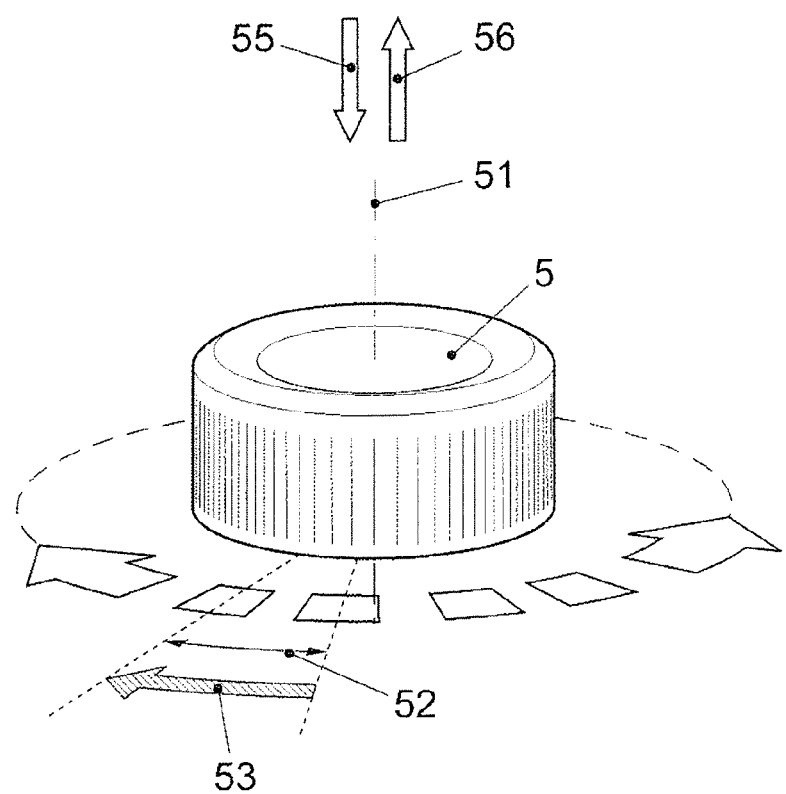
FIG. 3 shows an exemplary embodiment of a rotary knob.

FIG. 3 shows an enlarged illustration of the rotary knob 5, wherein reference symbol 51 denotes the axis of rotation thereof about which it is able to rotate. Furthermore, the rotary knob 5 can be moved in an orientation of the axis of rotation 51, as indicated by the arrows 55 and 56. In this case, the arrow 55 symbolizes the rotary knob 5 being pushed in and the arrow 56 symbolizes the rotary knob being pulled out or the rotary knob 5 being released. Rotation of the rotary knob 5 is symbolized by the arrow 53. Reference symbol 52 symbolizes a prescribed angle of rotation which corresponds to an operator control action by means of which a marker for an entry in a list presented by means of the display 4 is shifted to an adjacent entry.

Figure 4:
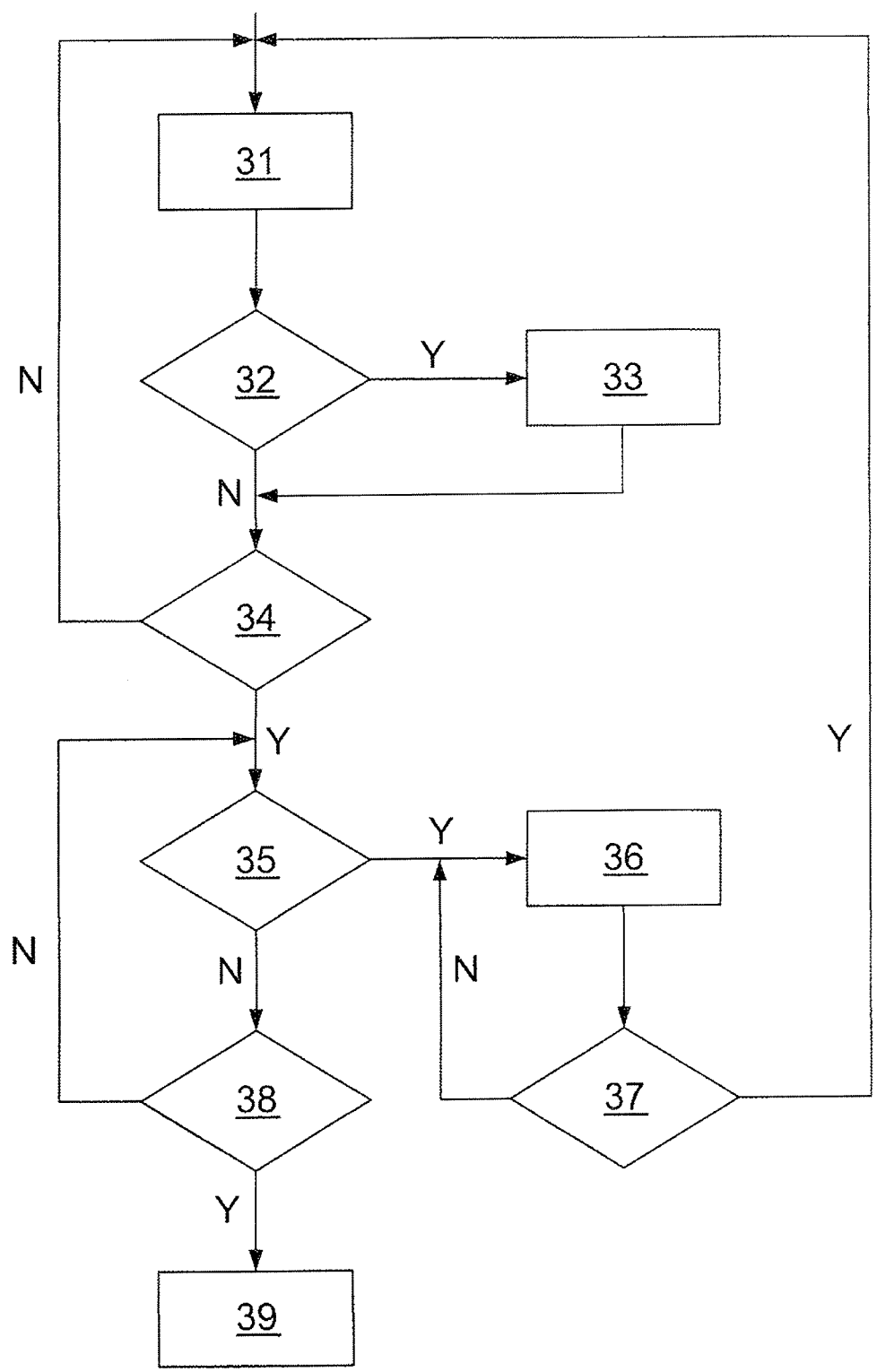
FIG. 4 shows an exemplary embodiment of a method for the operator control of the motor vehicle shown in FIG. 1.

FIG. 4 shows an exemplary embodiment of a method for the operator control of the motor vehicle 1 using the rotary knob 5. In this case, a list containing entries 61, 62, 63, 64, 65 or 71, 72, 73, 74, 75, 76, 78 is displayed in a step 31—as shown by way of example in FIG. 5 and FIG. 6. When the rotary knob 5 is rotated through the prescribed angle of rotation 52 (symbolized by test 32), an entry which is adjacent to a marked entry in the list is marked accordingly—in a step 33. With reference to the example in FIG. 6, the marker would skip from the entry 74 to the entry 73, for example.

When the rotary knob 5 is pushed in the direction of the arrow 55 (symbolized by test 34), the rotary knob 5 changes from a first operator control mode to a second operator control mode. When the rotary knob 5 is rotated in this second operator control mode (symbolized by test 35), the marker is—in a step—moved or scrolled quickly through the list presented by means of the display 4, with the speed at which the marker is moved either being prescribed or being dependent on the rotation of the rotary knob 5 or the angle of rotation of the rotary knob 5. When the rotary knob 5 is moved in the direction of the arrow 56 (symbolized by test 37), the rapid scrolling through the list or the movement of the marker is terminated.

When the rotary knob is moved in the direction of the arrow 56 without having been rotated previously (symbolized by test 38), the marked entry is selected in a step 39 and the function of the motor vehicle which is associated therewith is executed.

Figure 5:
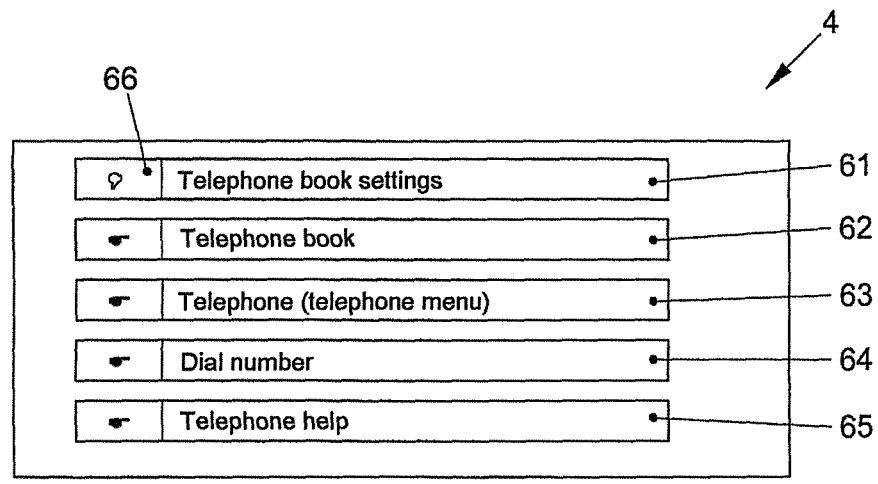
FIG. 5 shows an exemplary embodiment of a list displayed by means of a display.
Figure 6:
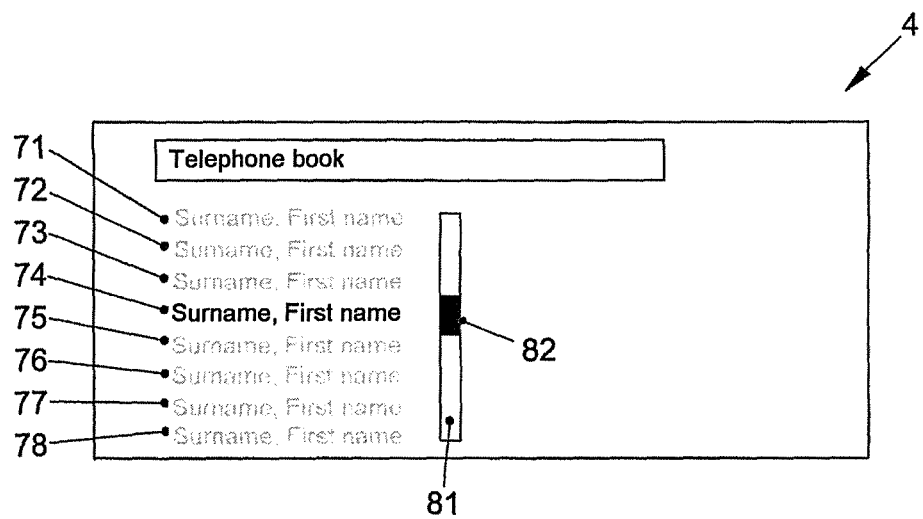
FIG. 6 shows a further exemplary embodiment of a list displayed by means of a display.

FIG. 5 and FIG. 6 show an exemplary embodiment of lists displayed by means of the display 4, wherein the entries 61, 62, 63, 64, 65 in the list in FIG. 5 are functions of a telephone, for example. The symbol denoted by reference symbol 66 indicates that the entry 61 is marked. Hence, the symbol 66 is an exemplary embodiment of a marker within the context of the claims. When, on the basis of the exemplary embodiment in FIG. 5, the rotary knob 5 is rotated about an angle of rotation 52 counter to the direction of the arrow 53, the entry is marked. When the rotary knob 5 is now pushed in the direction of the arrow 55 and in turn (without subsequent rotary movement) moved or "released" in the direction of the arrow 56, the marked entry 62 is selected and the relevant function is executed.

In the present exemplary embodiment, this means that the telephone book is called, that is to say that an operator control mask as shown in FIG. 6 is presented. In this case, the entries which are currently presented by means of the display 4 are denoted by reference symbols 71, 72, 73, 74, 75, 76, 78. In the present exemplary embodiment, the entry 74 is marked by means of visual highlighting. Alternatively, or in addition, a marker bar 81 having a marker 82 may be provided, for example.

Scrolling through a list or moving or skipping forward a marker within the context of the invention also comprises, in particular, the display of additional entries. If the entry 78 is marked, for example, and if the marker is intended to be moved on downwards, it is not moved on but rather it is used to mark additional displayed entries without moving the marker itself. This scrolling-through of entries, with a geographically unmoved marker, is likewise intended to be an exemplary embodiment of movement of a marker within the context of the invention. In this case, movement of a marker within the context of the invention is, in particular, not only geographical movement of a marker but rather, in particular, relative movement between the marker and entries in a list. In this context, it is insignificant whether the marker or an entry is moved in a geographical respect. Thus, in the exemplary embodiment in FIG. 6, provision may also be made for the marker to remain at the position of the entry 74 and, when "the marker is moved" (within the context of the claims) by virtue of the operator control of the rotary knob 5, for the entries to be moved up or down.

In a further refinement, provision is made for the motor vehicle 1 to comprise an actuator 12 which can be actuated by means of the display and operator control 10 for the purpose of haptic feedback from the rotary knob 5. Thus, in particular, provision may be made for the first operator control mode to involve the production of a click or latching movement, the haptics of which symbolize to the user that the marker has been moved by one entry. In addition or as an alternative, provision may be made for the actuator 12 to be used in the second operator control mode to produce a restoring force which, in particular, is dependent on and/or proportional to the rotation of the rotary knob 5 in the second operator control mode.

What is claimed is:

1. A motor vehicle comprising:
   a display that presents a list of entries, wherein an entry has an associated function of the motor vehicle; and
   a rotary knob associated with the display, which can be rotated about an axis of rotation and rotated through a prescribed angle of rotation in a first operator control mode to move a marker from one entry to an entry which is adjacent thereto,
   wherein the rotary knob movement in a first direction in an orientation of the axis of rotation triggers transfer to a second operator control mode, in which movement of the marker on the display is performed at a prescribed speed or at a speed which is dependent on the rotation of the rotary knob, and
   wherein an entry marked by the marker is selected by moving the rotary knob in the first direction and subsequently moving the rotary knob in a second direction, which is opposite to the first direction, provided that the rotary knob is not rotated between the movement in the first direction and the movement in the second direction, wherein both the first and second directions are in an orientation on the axis of rotation of the rotary knob.

2. The motor vehicle of claim 1, wherein an entry marked by the marker is selected by movement of the rotary knob in a second direction, which is opposite to the first direction.

3. The motor vehicle of claim 1, wherein an entry marked by the marker is selected by moving the rotary knob in the first direction and subsequently moving the rotary knob in a second direction, which is opposite to the first direction.

4. The motor vehicle of claim 1, also comprising:
   a mechanism for producing haptic feedback in the rotary knob when the marker is moved from one entry to the adjacent entry.

5. The motor vehicle of claim 1, also comprising:
   a mechanism for producing haptic feedback in the rotary knob when the marker is moved from one entry to the adjacent entry.

6. The motor vehicle of claim 1, also comprising:
   a mechanism for producing haptic feedback in the rotary knob when the marker is moved from one entry to the adjacent entry in the first operator control mode and not in the second operator control mode.

7. The motor vehicle of claim 6, wherein the mechanism is used to produce a restoring force in the rotary knob when said rotary knob is rotated in the second operator control mode and not in the first operator control mode.

8. The motor vehicle of claim 6, also comprising:
   a mechanism for producing haptic feedback in the rotary knob when the marker is moved from one entry to the adjacent entry in the first operator control mode and not in the second operator control mode.

9. The motor vehicle of claim 8, wherein the mechanism is used to produce a restoring force in the rotary knob when said rotary knob is rotated in the second operator control mode and not in the first operator control mode.

10. The motor vehicle of claim 1, also comprising:
    a mechanism for producing a restoring force in the rotary knob when said rotary knob is rotated in the second operator control mode and not in the first operator control mode.

11. A motor vehicle comprising:
    a display;
    a controller, associated with the display, for the operator control of a function of the motor vehicle and for presenting a list of entries on the display, wherein an entry has an associated function of the motor vehicle; and
    a rotary knob which can be rotated about an axis of rotation in a first operator control mode, wherein the rotary knob can be moved in a first direction in an orientation of the axis of rotation in order to transfer it to a second operator control mode, in which the rotary knob can be used to scroll through the list at a prescribed speed or at a speed which is dependent on a rotation of the rotary knob, and
    wherein an entry marked by the marker is selected by moving the rotary knob in the first direction and subsequently moving the rotary knob in a second direction, which is opposite to the first direction, provided that the rotary knob is not rotated between the movement in the first direction and the movement in the second direction, wherein both the first and second directions are in an orientation on the axis of rotation of the rotary knob.

12. The motor vehicle of claim 11, wherein an entry can be selected by moving the rotary knob in a second direction, which is opposite to the first direction.

13. The motor vehicle of claim 11, wherein an entry can be selected by moving the rotary knob in the first direction and subsequently moving the rotary knob in a second direction, which is opposite to the first direction.

14. The motor vehicle of claim 11, also comprising:
    a mechanism for producing haptic feedback in the rotary knob when scrolling through the list.

15. The motor vehicle of claim 11, also comprising:
    a mechanism for producing haptic feedback in the rotary knob when scrolling through the list.

16. The motor vehicle of claim 11, also comprising:
    a mechanism for producing haptic feedback in the rotary knob when scrolling through the list in the first operator control mode but not in the second operator control mode.

17. The motor vehicle of claim 16, wherein the mechanism is used to produce a restoring force in the rotary knob when said rotary knob is rotated in the second operator control mode and not in the first operator control mode.

18. The motor vehicle of claim 11, also comprising:
a mechanism for producing a restoring force in the rotary knob when said rotary knob is rotated in the second operator control mode and not in the first operator control mode.

19. A method for the operator control of a function of a motor vehicle, the method comprising:
presentation of a list of entries on a display in the motor vehicle;
registering movement of a rotary knob in the motor vehicle in a first direction in an orientation of an axis of rotation of the rotary knob;
registering rotation of the rotary knob, wherein a marker is moved through the list at a prescribed speed or at a speed which is dependent on the registered rotation of the rotary knob;
registering movement of the rotary knob in a second direction, which is opposite to the first direction;
registering movement of the rotary knob in the first direction; and
registering selection of an entry marked by the marker from the list by registered movement of the rotary knob in the second direction,
wherein an entry marked by the marker is selected by moving the rotary knob in the first direction and subsequently moving the rotary knob in a second direction, which is opposite to the first direction, provided that the rotary knob is not rotated between the movement in the first direction and the movement in the second direction, wherein both the first and second directions are in the orientation on an axis of rotation of the rotary knob.

20. The method of claim 19, also comprising:
execution of the function of the motor vehicle which is associated with the selected entry.

21. A method for the operator control of a function of a motor vehicle, the method comprising:
presentation of a list of entries on a display in the motor vehicle;
registering movement of a rotary knob in the motor vehicle in a first direction in an orientation of an axis of rotation of the rotary knob;
registering rotation of the rotary knob, wherein a marker is moved through the list at a prescribed speed or at a speed which is dependent on the rotation of the rotary knob; and
registering movement of the rotary knob in a second direction, which is opposite to the first direction,
wherein an entry marked by the marker is selected by moving the rotary knob in the first direction and subsequently moving the rotary knob in a second direction, which is opposite to the first direction, provided that the rotary knob is not rotated between the movement in the first direction and the movement in the second direction, wherein both the first and second directions are in the orientation on an axis of rotation of the rotary knob.

22. The method of claim 21, also comprising:
registering rotation of the rotary knob, wherein the marker is moved from one entry to an entry which is adjacent thereto by rotating the rotary knob through a prescribed angle of rotation.

23. The method of claim 22, also comprising:
registering movement of the rotary knob in the first direction.

24. The method of claim 23, also comprising:
selection of an entry marked by means of the marker from the list by moving the rotary knob in the second direction.

25. The method of claim 24, also comprising:
execution of the function of the motor vehicle which is associated with the selected entry.

26. The method of claim 21, also comprising:
registering rotation of the rotary knob, wherein the marker is moved from one entry to an entry which is adjacent thereto by rotating the rotary knob through a prescribed angle of rotation, wherein the rotary knob is rotated until a desired entry is marked by the marker.

27. The method of claim 26, also comprising:
movement of the rotary knob in the first direction.

28. The method of claim 27, also comprising:
selection of an entry marked by the marker from the list based on movement of the rotary knob in the second direction.

29. The method of claim 28, also comprising:
execution of the function of the motor vehicle which is associated with the selected entry.

* * * * *